United States Patent Office 3,033,876
Patented May 8, 1962

3,033,876
RUBBER ACCELERATOR
James O. Biose, Bound Brook, N.J., assignor to American Cyanamid Company, New York, N.Y., a corporation of Maine
No Drawing. Filed Sept. 24, 1958, Ser. No. 762,907
2 Claims. (Cl. 260—306.5)

This invention relates to the preparation of a rubber vulcanization accelerator. More particularly, it relates to an improved method of preparing a pelletized benzothiazolyldisulfide.

Solid rubber compounding ingredients, such as benzothiazolyldisulfide, are generally prepared as fine powders. Finely powdered benzothiazolyldisulfide, however, when incorporated into rubber by milling, sticks and cakes on the mill rolls and is not readily dispersed in the rubber. In addition, it is extremely dusty which results in a loss of material as well as undesirable working conditions for those required to handle material.

These disadvantages could be greatly reduced if benzothiazolyldisulfide could be formed into aggregates or pellets. Of the various processes which have been suggested for pelletizing benzothiazolyldisulfide, one which shows considerable potential success is that described and claimed in U.S. Patent No. 2,840,564. In general, pelletized benzothiazolyldisulfide is prepared according to the process of said patent by forming an aqueous slurry comprising finely divide benzothiazolyldisulfide and a small amount of aminothiophenol. The aqueous slurry is then heated and agitated to provide intimate contact for agglomeration. After agglomerates of desired size have been formed, the slurry is cooled and resultant pellets separated.

In the process as described, the nature of the agitation of the slurry during the final heating period when agglomeration occurs has been observed to be an important factor in determining the uniformity and size of the resultant pellets. Uniformity and size of pellets are related to the violence of agitation. As agitation energy is reduced below a certain critical level, more and more undesirable oversize pellets, i.e., greater than 10-mesh in size, are contained in the product. When the process of pelletization is carried out in large scale plant equipment the factor of agitation becomes especially important. While the violent agitation necessary to obtain desired results may be readily accomplished in laboratory equipment, the power requirements necessary when conducting the process in commercial plant equipment may be so great that the same agitation cannot be achieved. As a result, large or oversized particles are formed. When these oversized particles constitute an undesirable proportion of the product, it becomes necessary to subject the product to screening. The large particles thus removed must then be reprocessed. All of this results in a loss of time and material as well as increased processing and overhead.

An improved process for pelletizing benzothiazolyldisulfide using aminothiophenol as the agglomerating agent which would eliminate the necessity for violent agitation to obtain pellets in the desired size range, therefore, would be highly desirable. Particularly would such an improvement be desirable in large scale commercial installations where the necessary agitation is difficult to attain. It is a principal object of this invention to provide such an improved process. It is a further object of this invention to provide such a process which not only results in pellets within the desired size range, but which obtains such pellets without the strict control heretofore required. It is a still further object of this invention to provide such a process which provides pellets that exhibit excellent dispersibility when combined with rubber.

According to the prior art process described generally above, an aqueous slurry of benzothiazolyldisulfide at a pH of 8.0–8.5 and containing at least 1% aminothiophenol, preferably 5–15%, is subjected to a temperature of 75° C., preferably 85–100° C., with agitation. The process may be conducted so that the agglomeration occurs under alkaline or acid conditions. Preferably, however, the alkaline mixture is first heated for a period of time ranging up to an hour but generally about 15–30 minutes. The pH of the mixture, preferably without cooling, is then adjusted to neutral or acid, usually to a pH of 5.0–5.5 as by the addition of acetic, hydrochloric, sulfuric or the like acid. The elevated temperature is then maintained and agitation continued until agglomeration is complete. This will usually be in 1–2 hours and in many instances in 15–30 minutes after pH adjustment. To insure completion of agglomeration in about 15–30 minutes, it is advantageous to have present 3–10% of sulfur on the weight of the benzothiazolyldisulfide during the period of agglomeration. It is further desirable to include in the mixture about 5–15% of a fatty acid, such as stearic acid, not as an aid for agglomeration but as lubricant for the final pellets when dispersed in rubber.

According to the present invention, the violent agitation required in said process to obtain pellets in a desirable size range without excessive oversizing becomes unnecessary. Surprisingly, it has now been discovered that this can be accomplished by including in the aqueous mixture during agglomeration a non-ionic surface active agent. Exactly why pellets of a uniform size range can be obtained by conducting agglomeration in the presence of a non-ionic surface active agent without violent agitation is not clear nor is there any desire to limit this invention by any particular theory. Suffice it to say that the results are completely surprising inasmuch as similar results are obtained with either anionic nor cationic surface active agents.

Any of the various non-ionic surface active agents may be employed in the process of this invention. Illustrative of such materials are alkyl aryl polyether alcohol (Triton X–100), polyoxyethylene sorbitan monolaurate (Tween 20), alkyl aryl polyethylene glycol ether (Surfonic N–95), polyoxyethylene ester of fatty acid (Energetic), alkyl phenoxy polyoxyethylene ethanol (Igepal CO–630), and the like.

The amount of surface active agent employed may vary widely. As little as 1.0% based on the weight of benzothiazolyldisulfide has been found to give improved results. Larger amounts may be employed but no added advantage seems to be gained by operating at greater than about 10%. The usual practice will be to employ about 4–6% of surface active agent.

The usual slurry density employed in the process in the absence of surface active agent is about 15–30%. The presence of the surface active agent, however, not only results in uniform particle size formation in large scale plant equipment without violent agitation, but also permits the treatment of denser slurries. Thus, in the presence of a non-ionic surface active agent, more concentrated slurries of as high as 35% benzothiazolyldisulfide solids can be pelletized smoothly with moderate agitation and with little or no tendency to form oversized pellets.

In the process of the present invention, the point at which the non-ionic surface active agent is added is not critical. The important factor is that it be present during the agglomerating period. Thus, in applying the present improvement to the preferred procedure of the prior art process, the surface active agent would be added at some point prior to pH adjustment. As a practical matter, such addition would be made when the aqueous slurry is initially prepared.

As an added advantage of the present invention, it has been found that pellets exhibiting excellent dispersibility are obtained by the practice of the improvement. What is particularly surprising, however, is that pellets of such dispersibility are obtained in the absence of stearic acid or other fatty acid conventionally employed in the art as a lubricant. The reason why this dispersibility is obtained is not understood. It may be that a beneficial effect is exhibited by the presence of some non-ionic surface active agent retained in the pellets, although such surface active agent retained is minute. Nevertheless, in spite of the dispersibility thus obtained, it still may be desirable in some instances to conduct the pelletization in the presence of stearic acid to obtain pellets containing appreciable amounts thereof.

The following examples will further illustrate the invention. All parts are by weight unless otherwise noted.

Throughout the examples, the following abbreviations will be used: MBTS—benzothiazolyldisulfide; ATP—aminothiophenol.

Example 1 involves pelletizing without a non-ionic surface active agent.

Example 1

To 819 parts of an aqueous slurry containing 100 parts of MBTS is added, with stirring, 5 parts of 200-mesh sulfur and 26 parts of a solution of sodium ATP containing 6 parts of ATP. The mixture is heated at 98–100° C. while stirring at 800 to 900 r.p.m. After 15 minutes, dilute acetic acid is added to adjust the pH to 5.0–5.5. After continued stirring at 800 to 900 r.p.m. at 100° C. for 10 minutes, bead-like agglomerates of 40- to 60-mesh form. Cold water is added to drop the temperature to 65° C. and the product screened off, washed and dried. The product contained 23% of oversized particles retained on a 10-mesh screen.

Example 2

To 1250 parts of an aqueous slurry of MBTS containing 100 parts of real MBTS is added, with stirring, 3.7 parts of 200-mesh sulfur and 22 parts of sodium ATP solution containing 4.5 parts of ATP. The mixture is heated to 100° C. while stirring at 800 to 900 r.p.m. After 15 minutes, 3.7 parts of Triton X–100 (an alkyl aryl polyether alcohol) is added and the pH adjusted to 5.5 with acetic acid. After continued stirring and heating at 98 to 100° C. for 15 minutes, bead-like aggomerates to 20- to 40-mesh size form. The mixture is cooled to 65° C. and the product separated by screening. After drying, the pellets are found to be very uniform in size, about 20-mesh. No material was retained as oversize on a 10-mesh screen.

Example 3

To 1450 parts of an aqueous slurry containing 58 parts of MBTS is added, with stirring and at about 40° C., 4.1 parts of sulfur and 21 parts of sodium ATP solution containing 2.9 parts of real ATP. The mixture is heated to 100° C. while stirring. After 15 minutes at 100° C., 2.9 parts of Energetic (a polyoxyethylene ester of a fatty acid) is added to the mixture and dilute acetic acid added to adjust the pH to 5.5. After continued stirring and heating at 100° C. for 18 minutes, the slurry agglomerates into bead-like pellets. The mixture is cooled to 65° C. by the addition of cold water and the product isolated by screening and then washed and dried. The product is about 20-mesh in size and less than 1% is retained as oversize on a 10-mesh screen.

Example 4

Example 3 is repeated except that 2.9 parts Igepal CA–630 (iso-octyl phenoxy polyethylene ethanol) is employed as the non-ionic surface active agent. The resultant product is in the form of uniform pellets about 20-mesh in size with no oversize particles.

Example 5

To a stirred plant size vessel containing a 5% aqueous slurry of 71 parts of MBTS there is added 3.5 parts of 200-mesh powdered sulfur dispersed in a solution of 7.1 parts of stearic acid dissolved with 1.3 parts of caustic soda in 63 parts of water, and 23 parts of an aqueous solution of sodium ATP containing 3.5 parts of ATP. The mixture is stirred, heated to 100° C. and held for 30 minutes, at which time the pH is adjusted with acid to pH 5.0. After additional heating and stirring at 100° C. for 20 minutes the slurry has agglomerated to about 20-mesh size. Cold water is added to lower the temperature to 70° C. After screening, washing and drying, 81 parts of product is found to contain 10% of oversized particles which are retained on a 10-mesh screen.

Example 6

In the same vessel as in Example 5 containing a 32.8% aqueous slurry of 571 parts of MBTS, there is added 29.5 parts of a non-ionic surface active agent Surfonic N–95 (an alkyl aryl polyethylene glycol ether) mixed with 59 parts of 200-mesh sulfur in 40 parts of water. An aqueous solution of 13.4% sodium ATP containing 23 parts of ATP is added and the mixture stirred and heated to 100° C. After 15 minutes at 100° C., the mixture is acidified to pH 5.0–5.5. Stirring and heating at 100° C. is continued for 15 minutes to form bead-like agglomerates. The mixture is cooled by the addition of cold water and the product screened off, washed and dried. 617 parts of a pelletized product is obtained of which 98% passes through a 10-mesh screen and is retained on a 40-mesh screen.

I claim:

1. In the coprecipitation of benzothiazolyldisulfide and aminothiophenol as agglomerated solids, from an aqueous alkaline slurry comprising (a) said benzothiazolyldisulfide in finely-divided form and (b) from about five to about fifteen weight percent thereof aminothiophenol, by a process wherein said slurry is (1) agitated at a temperature above about 85° C.; (2) its pH is then adjusted to from about 5.0 to about 5.5; thereafter (3) at a temperature above about 85° C., agitation of so-treated slurry is continued for sufficient time to agglomerate and coprecipitate said solids and (4) the degree of agitation is maintained sufficiently high to prevent substantially all formation and precipitation of said solids in the size range above about five mesh; an improvement whereby using less power at a lower degree of agitation substantially all said coprecipitated solids are obtained in substantially uniform composition in the size range of from about minus ten mesh to about plus forty mesh, said improvement consisting of: prior to said pH adjustment, adding to said slurry from about one to about ten weight percent of a non-ionic surface-active agent.

2. A process according to claim 1 in which said slurry and said particulate solids also contain sulfur in the amount of from about three to about ten weight percent of said benzothiazolyldisulfide of sulfur.

References Cited in the file of this patent

UNITED STATES PATENTS

| | | |
|---|---|---|
| 2,475,582 | Chao | July 12, 1949 |
| 2,753,324 | Lintala et al. | July 3, 1956 |
| 2,840,564 | Kinstler | June 24, 1958 |